United States Patent
Jaaskelainen et al.

(10) Patent No.: US 9,617,847 B2
(45) Date of Patent: Apr. 11, 2017

(54) ROBUST OPTICAL FIBER-BASED DISTRIBUTED SENSING SYSTEMS AND METHODS

(71) Applicant: Halliburton Energy Services, Inc., Duncan, OK (US)

(72) Inventors: Kari-Mikko Jaaskelainen, Katy, TX (US); Henry C. Bland, Calgary (CA); Benjamin M. Banack, Calgary (CA); David A. Barfoot, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 741 days.

(21) Appl. No.: 14/066,215

(22) Filed: Oct. 29, 2013

(65) Prior Publication Data
US 2015/0116124 A1    Apr. 30, 2015

(51) Int. Cl.
G01B 11/16 (2006.01)
E21B 47/12 (2012.01)
E21B 47/06 (2012.01)

(52) U.S. Cl.
CPC ............ *E21B 47/123* (2013.01); *E21B 47/06* (2013.01); *G01B 11/16* (2013.01)

(58) Field of Classification Search
CPC ....... G01N 21/474; G01N 2201/06113; G01N 2201/088; G01N 21/774; G01J 3/44; G01J 5/08; G01J 5/0821; G01F 1/661; G01M 11/331; G01L 11/025
See application file for complete search history.

(56) References Cited

U.S. PATENT DOCUMENTS 7,561,771 B2   7/2009  Jaaskelainen et al.
8,176,790 B2   5/2012  Birch et al.
(Continued)

FOREIGN PATENT DOCUMENTS

GB        2489760 A        10/2012
WO    WO 2011/115683       9/2011
WO    WO 2011/139347      11/2011

OTHER PUBLICATIONS

"Kylia Modal Mux-Demux", http://www.kylia.com/Kylia.modal. mux.pdf, 2013, 3 pgs.
(Continued)

*Primary Examiner* — Michael P Stafira
(74) *Attorney, Agent, or Firm* — Iselin Law PLLC; John W. Wustenberg

(57) ABSTRACT

An illustrative distributed sensing system includes a fiberoptic cable, a transmitter module, and a receiver module. The transmitter module is coupled to the fiberoptic cable to communicate light in each of multiple independent paths to each of multiple positions along the cable, The receiver module is coupled to the fiberoptic cable to receive backscattered light from said multiple positions along the cable via the multiple independent paths. The receiver module includes at least one receiver for each of said multiple independent paths to obtain simultaneous measurements for each of said multiple positions. The multiple independent paths may be provided by wave division multiplexing, frequency division multiplexing, spatial mode division multiplexing, multicore fiber, and/or multiple fibers.

18 Claims, 4 Drawing Sheets

(56) References Cited

U.S. PATENT DOCUMENTS

| | | | |
|---|---|---|---|
| 8,408,064 B2* | 4/2013 | Hartog | E21B 47/101 73/643 |
| 8,553,211 B2 | 10/2013 | Jaaskelainen | |
| 8,924,158 B2* | 12/2014 | Kragh | G01H 9/004 702/17 |
| 9,316,754 B2* | 4/2016 | Kragh | E21B 47/02208 |
| 2003/0234921 A1* | 12/2003 | Yamate | G01K 11/32 356/73.1 |
| 2005/0140966 A1* | 6/2005 | Yamate | G01K 11/32 356/73.1 |
| 2012/0060615 A1* | 3/2012 | Farhadiroushan | G01D 5/35303 73/655 |
| 2012/0067118 A1* | 3/2012 | Hartog | E21B 41/00 73/152.16 |
| 2012/0105826 A1 | 5/2012 | Kalar et al. | |
| 2012/0127459 A1* | 5/2012 | Handerek | G01D 5/353 356/73.1 |
| 2012/0162639 A1 | 6/2012 | Farhadiroushan et al. | |
| 2012/0206718 A1 | 8/2012 | Jaaskelainen | |
| 2012/0250722 A1 | 10/2012 | Barfoot et al. | |
| 2013/0003777 A1 | 1/2013 | Jaaskelainen et al. | |
| 2013/0042415 A1 | 2/2013 | Jaaskelainen | |
| 2013/0209029 A1 | 8/2013 | Mitchell et al. | |
| 2013/0271769 A1* | 10/2013 | Handerek | E21B 47/06 356/446 |

OTHER PUBLICATIONS

"OFS Few-Mode Fiber", http://www.specialtyphotonics.com, Mar. 18, 2013, 2 pgs.

Hariharan, Parameswaran "Interferometers", Handbook of Optics, Third Edition, vol. 1, 2010, Chapter 32, 24 pgs.

Jaaskelainen, Kari-Mikko "In-Situ System Calibration", U.S. Appl. No. 13/751,056, filed Jan. 26, 2013, 29 pgs.

Jaaskelainen, Mikko et al., "Downhole Multiple Core Optical Sensing System", U.S. Appl. No. 13/847,165, filed Mar. 19, 2013, 27 pgs.

Park, Brian et al., "Method and Device for Installing Multiple Fiber Optic Cables in Coiled Tubing", U.S. Appl. No. 13/771,332, filed Feb. 20, 2013, 22 pgs.

Park, Brian et al., "Method for Installing Multiple Sensors in Coiled Tubing", U.S. Appl. No. 13/771,355, filed Feb. 20, 2013, 19 pgs.

Tayag, Tristan J., et al., "Digital Demodulation of Interferometric Signals", InTech, Modern Metrology Concerns, Texas Christian University, USA, (2012), 17 pgs.

* cited by examiner

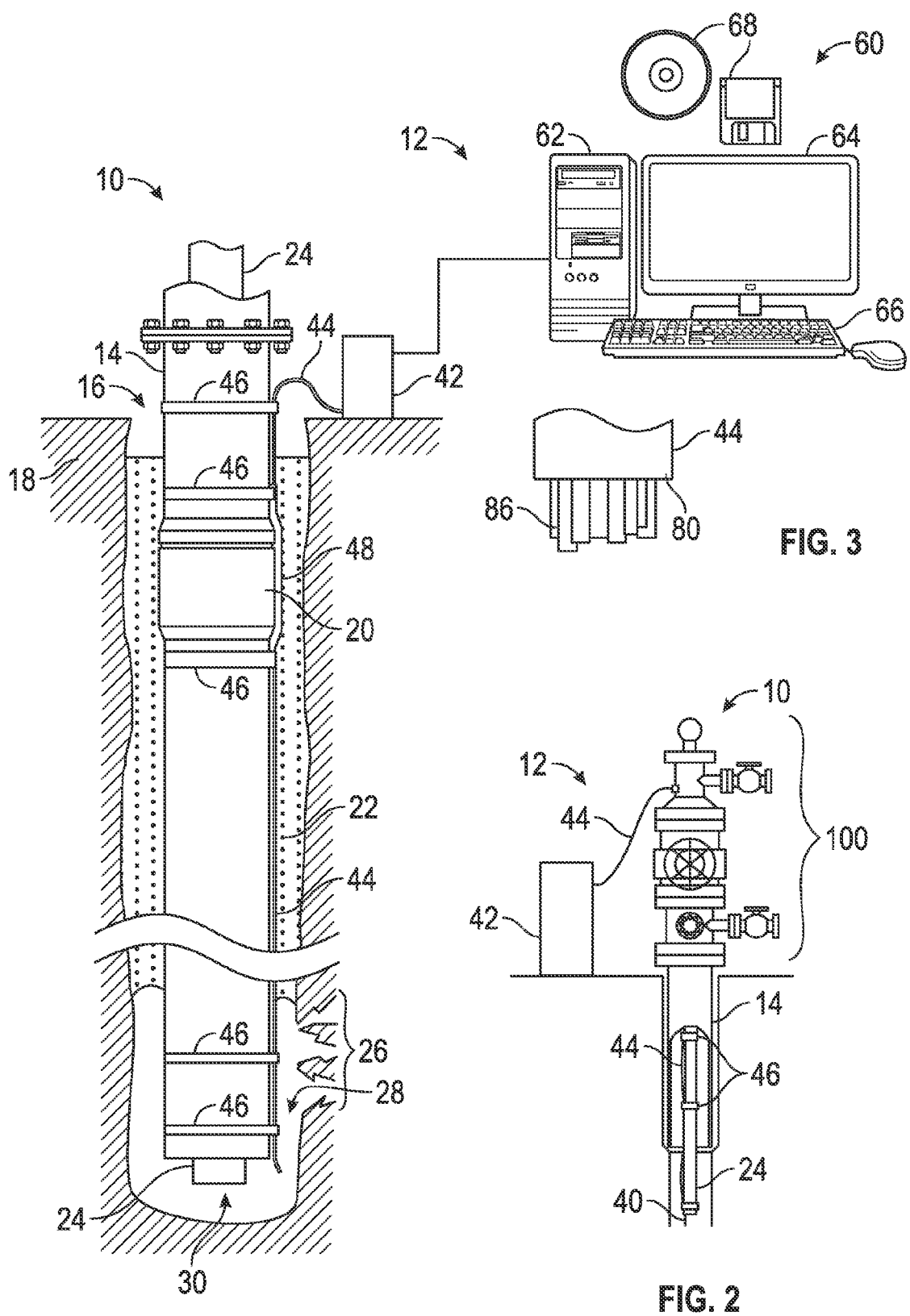

ROBUST OPTICAL FIBER-BASED DISTRIBUTED SENSING SYSTEMS AND METHODS

BACKGROUND

Distributed optical sensing technology is turning out to be suitable for a number of downhole applications ranging from temperature sensing to passive seismic monitoring. As engineers develop new and improved systems to increase performance and sensitivity, they have encountered certain obstacles. For example, interferometry has proven to be a largely successful approach for enhancing sensitivity, yet it suffers from a phenomenon known as "polarization fading". When two coherent beams have differing polarizations, they become unable to form the characteristic constructive and destructive interference fringes needed for interferometry. Many fiber installations suffer from unpredictable, dynamic changes in polarization, which are often attributed to small changes in temperature, strain, or just age. In some existing distributed acoustic systems, it is common for around 10% of the sensing channels to be suppressed due to this phenomenon.

Another illustrative obstacle is measurement noise, i.e., noise generated by the sensor and/or receiver electronics. In applications such as passive seismic, the desired signals are extremely weak and may be obscured by this noise.

The conventional solution to these issues is to call for more expensive fiber and receiver electronics. This solution is generally undesirable, particularly for existing installations where it is simply infeasible to replace the existing cable.

BRIEF DESCRIPTION OF THE DRAWINGS

Accordingly, there are disclosed in the drawings and the following description robust optical fiber-based distributed sensing systems and methods that employ measurement diversity. In the drawings:

FIG. 1 shows an illustrative downhole optical sensor system in a production well.

FIG. 2 shows an alternative downhole optical sensor system embodiment.

FIG. 3 shows an illustrative fiber optic cable suitable for downhole use.

Figure 4:
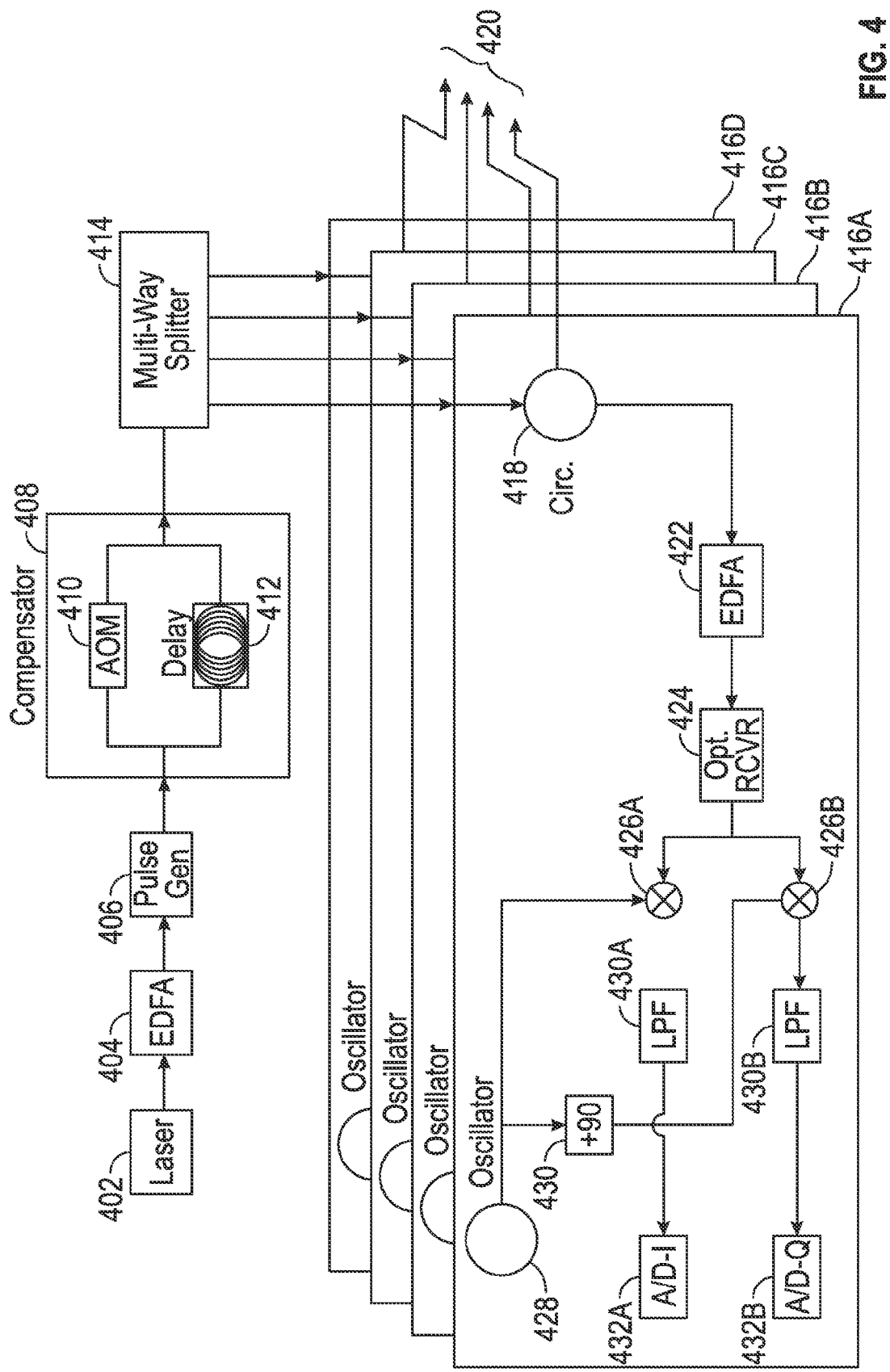
FIG. 4 shows an illustrative distributed optical sensing heterodyne system with fiber diversity.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The obstacles outlined above are at least in part addressed by the disclosed optical fiber-based systems that employ measurement diversity to enhance sensitivity and robustness. Some disclosed embodiments employ wavelength diversity. Some disclosed embodiments employ multi-core and/or multi-fiber diversity. Some disclosed embodiments employ spatial mode diversity. Some disclosed embodiments employ multiple forms of diversity to further enhance sensitivity and robustness. Whether achieved via one or more diversity modes, the system acquires distributed sensing measurements on multiple independent paths and combines them. At least some embodiments of the combining process include a cross-correlation step to spatially align channels on the independent paths, and may further include a measurement quality comparison to weight or filter the combination of measurements.

Turning now to the figures, FIG. 1 shows a well 10 equipped with an illustrative embodiment of a downhole optical sensor system 12. The well 10 shown in FIG. 1 has been constructed and completed in a typical manner, and it includes a casing string 14 positioned in a borehole 16 that has been formed in the earth 18 by a drill bit. The casing string 14 includes multiple tubular casing sections (usually about 30 foot long) connected end-to-end by couplings. One such coupling is shown in FIG. 1 and labeled '20.' Within the well 10, cement 22 has been injected between an outer surface of the casing string 14 and an inner surface of the borehole 16 and allowed to set. A production tubing string 24 has been positioned in an inner bore of the casing string 14.

The well 10 is adapted to guide a desired fluid (e.g., oil or gas) from a bottom of the borehole 16 to a surface of the earth 18. Perforations 26 have been formed at a bottom of the borehole 16 to facilitate the flow of a fluid 28 from a surrounding formation into the borehole and thence to the surface via an opening 30 at the bottom of the production tubing string 24. Note that this well configuration is illustrative and not limiting on the scope of the disclosure.

The downhole optical sensor system 12 includes an interface 42 coupled to a fiber optic cable 44 for distributed downhole sensing. The interface 42 is located on the surface of the earth 18 near the wellhead, i.e., a "surface interface". In the embodiment of FIG. 1, the fiber optic cable 44 extends along an outer surface of the casing string 14 and is held against the outer surface of the of the casing string 14 at spaced apart locations by multiple bands 46 that extend around the casing string 14. A protective covering may be installed over the fiber optic cable 44 at each of the couplings of the casing string 14 to prevent the cable from being pinched or sheared by the coupling's contact with the borehole wall. In FIG. 1, a protective covering 48 is installed over the fiber optic cable 44 at the coupling 20 of the casing string 14 and is held in place by two of the bands 46 installed on either side of coupling 20.

In at least some embodiments, the fiber optic cable 44 terminates at surface interface 42 with an optical port adapted for coupling the fiber optic cable to a light source and a detector. The light source transmits light pulses along the fiber optic cable 44, which contains scattering impurities. As the pulse of light propagates along the fiber, some of the pulse is scattered back along the fiber from every point on the fiber. The optical port communicates the backscattered light to the detector. As will be explained in greater detail below, the detector responsively produces electrical measurements of differences in backscattered light phase at each point in the fiber.

The illustrative downhole optical sensor system 12 of FIG. 1 further includes a computer 60 coupled to the surface interface 42 to control the light source and detector. The illustrated computer 60 includes a chassis 62, an output device 64 (e.g., a monitor as shown in FIG. 1, or a printer), an input device 66 (e.g., a keyboard), and information storage media 68 (e.g., magnetic or optical data storage disks). However, the computer may be implemented in different forms including, e.g., an embedded computer permanently installed as part of the surface interface 42, a portable computer that is plugged into the surface interface 42 as desired to collect data, and a remote desktop computer coupled to the surface interface 42 via a wireless link and/or a wired computer network. The computer 60 is adapted to receive the electrical measurement signals produced by the surface interface 42 and to responsively determine a distributed parameter such as, e.g., distributed acoustic sensing along the length of the casing string.

For example, the information storage media 68 may store a software program for execution by computer 60. The instructions of the software program may cause the computer 60 to collect phase differences of backscattered light derived from the electrical signal from surface interface 42 and, based at least in part thereon, to determine downhole parameters such as acoustic signals at each point on the fiber 44. The instructions of the software program may also cause the computer 60 to display the acoustic waveforms or envelopes associated with each point on the fiber via the output device 64.

FIG. 2 shows an alternative embodiment of downhole optical sensor system 12 having the fiber optic cable 44 strapped to the outside of the production tubing 24 rather than the outside of casing 14. Rather than exiting the well 10 from the annular space outside the casing, the fiber optic cable 44 exits through an appropriate port in the "Christmas tree" 100, i.e., the assembly of pipes, valves, spools, and fittings connected to the top of the well to direct and control the flow of fluids to and from the well. The fiber optic cable 44 extends along the outer surface of the production tubing string 24 and is held against the outer surface of the of the production tubing string 24 at spaced apart locations by multiple bands 46 that extend around the production tubing string 24. The downhole optical sensor system 12 of FIG. 2 optionally includes a hanging tail 40 at the bottom of a borehole. In other system embodiments, the fiber optic cable 44 may be suspended inside the production tubing 24 and held in place by a suspended weight on the end of the fiber.

FIG. 3 shows an illustrative configuration for fiber optic cable 44, with twenty optical fibers 86 contained within eighth-inch (⅛") stainless steel capillary tubing 80. A thixotropic filler material may occupy the residual space to displace any gases and to provide effective acoustic coupling between the tubing and the fibers. Various different fibers may be used for different purposes, e.g., with one fiber employed for distributed temperature sensing, one fiber employed for telemetry with a downhole controller, and other fibers for communication with an array of point sensors. One or more electrical conductors may also be included, and in some implementations the stainless steel tubing is encased within a protective material such as rubber.

We note here that the incremental cost of adding more fibers 86 to tubing 80 is low. Accordingly, one affordable way to increase the sensitivity of a distributed sensing system (and simultaneously increasing the system's resistance to polarization fading) is to install and interrogate multiple parallel fibers simultaneously. The achievable increase in signal to noise ratio should enable accurate measurement of low amplitude signals such as are found in passive seismic sensing applications.

FIG. 4 shows an illustrative distributed sensing system configuration that employs multiple parallel fibers. A laser 402 emits a beam of coherent light. An optional erbium-doped fiber amplifier (EDFA) 404 amplifies the signal. A pulse generator 406 turns the beam into pulses with an adjustable width and adjustable spacing. An illustrative pulse width of 1 nanosecond would offer a spatial resolution of about 1 foot, and an illustrative pulse spacing of 0.1 milliseconds would offer a sampling rate of 10 kHz on a 10 kilometer fiber. These values can be tailored to the particular details of each installation.

Compensator 408 converts each pulse into a double pulse, using a dual path system with a delay coil 412 in one path and an acousto-optic modulator (AOM) 410 in the other path. The modulator 410 provides a frequency shift, so that the two pulses exiting the compensator 408 are at slightly different frequencies. A multi-way splitter 414 evenly distributes the double pulse interrogation signal energy to multiple parallel modules 416A-416D.

Each module 416 includes a circulator 418 to direct the interrogation signal to a respective one of multiple parallel fibers 420. The circulator 418 also directs the backscattered light from the respective fiber to an EDFA 422 which amplifies the signal prior to its conversion to an electrical signal by optical receiver 424. The backscattered light is a combination of light from the two pulses scattered from different points on the fiber.

The frequency difference of the dual pulses creates a beat frequency in the combined backscatter. An oscillator 428 is tuned to demodulate this beat frequency to baseband in-phase and quadrature-phase signals. Multipliers 426A, 426B each take the product of the electrical beat frequency signal and the oscillator signal, with multiplier 426B employing a 90°-shift on the oscillator signal. Lowpass filters 430A and 430B forward the baseband component of the product signals to respective analog-to-digital converters 432A, 432B. Based on the time lag from each pulse signal launch, the digitized in-phase and quadrature-phase measurements are associated with a spatial position ("channel") on the fiber, and tracked as a function of pulse number to obtain a time-dependent measurement of channel phase, from which a corresponding acoustic signal can be readily determined. The optical phase of the returned light changes as the relevant portion of the fiber is stretched or compressed.

A computer collects the channel measurements from each module 416. As the fiber lengths and/or propagation times may be different for each fiber, the computer optionally performs a cross-correlation between neighboring channels on different fibers to determine a suitable channel alignment. The measurements from corresponding channels on different fibers may then be combined as outlined below.

Abbreviating the in-phase signal as "I" and the quadrature-pase signal as "Q", we have the following relations $I=\cos(\text{phase})$ $Q=\sin(\text{phase})$ $\text{phase}=\arctan(Q/I)$ $QF=I^2+Q^2$ where the quality factor ("QF") is a convenient representation of the channel noise level which can also be employed as a weighting factor. When combining corresponding channels from different fibers i, i=1 . . . F, one system embodiment obtains the combined phase measurement as:

$P(k)=\Sigma_{i=0}^{F} QF(k,i)\text{Phase}(k,i)/\Sigma_{i=0}^{F} QF(k,i)$ where k is the channel number, P(k) is the combined phase measurement, QF(k,i) is the quality factor for channel k on fiber i, and Phase(k,i) is the phase calculated from the in-phase and quadrature signals. In an alternative embodiment, measurements having a quality factor below a given threshold are excluded from the calculation.

We note here that the fibers 420 need not necessarily be separate fibers. In some system embodiments, the multiple parallel measurements may occur on multiple cores of a single multi-core fiber. Or multiple, multi-core fibers may be employed to further increase the number of parallel measurements. Alternatively or in addition, other diversity-increasing techniques may be employed.

Figure 5:
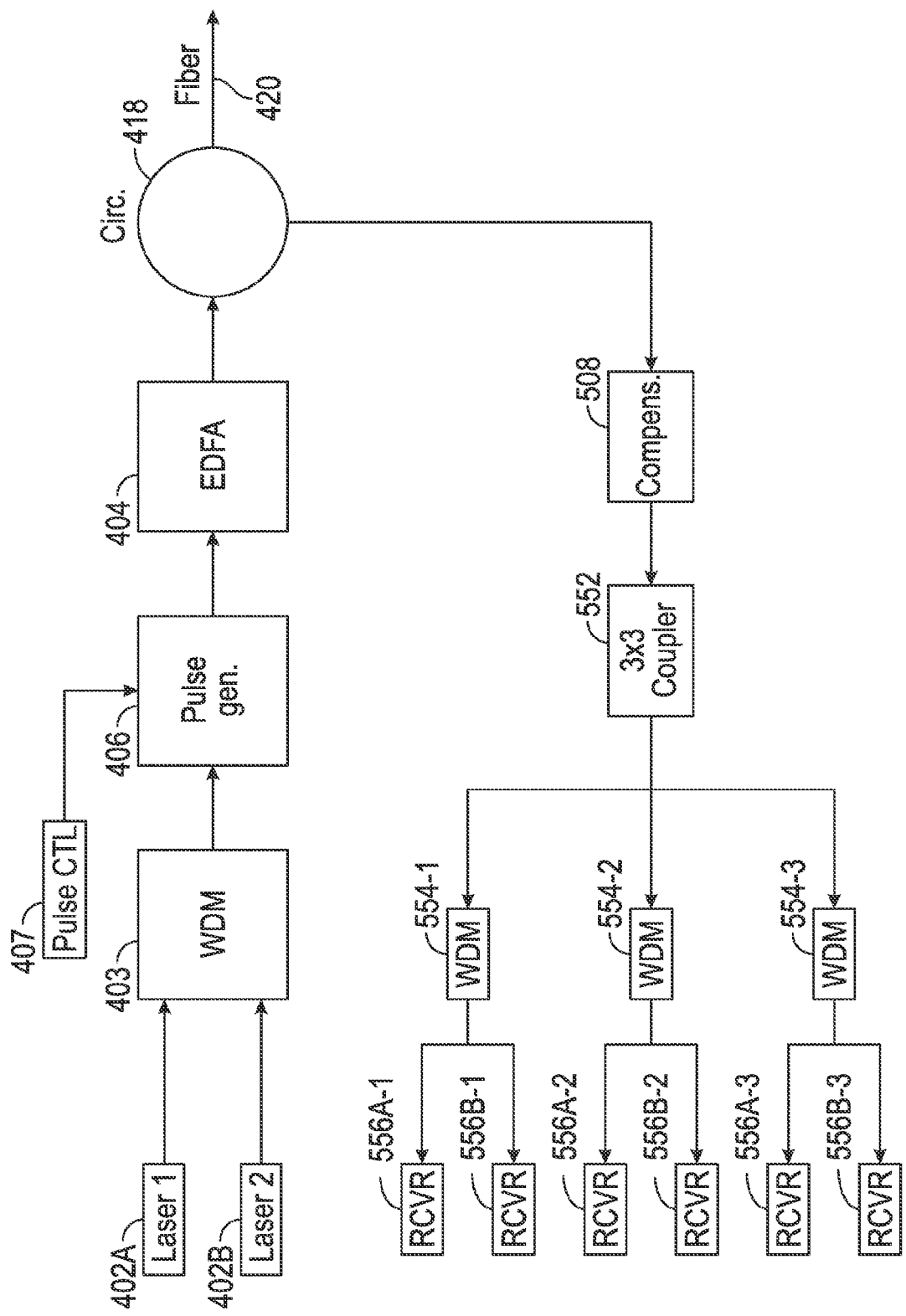
FIG. 5 shows an illustrative distributed optical sensing homodyne system with wavelength diversity.

For example, FIG. 5 shows an illustrative distributed sensing system that employs multiple wavelengths. It includes multiple lasers 402A, 402B, each generating a beam of coherent light at a respective wavelength, e.g., 1540 nm and 1550 nm. The beams are combined with a wavelength division multiplexer 403 and the combined beam is turned into pulses by a pulse generator 406. A pulse controller 407 enables the pulse widths and pulse spacings to be adjustable. An optional EDFA 404 amplifies the signal.

Circulator 418 sends the pulses to a distributed sensing fiber 420 and returns the backscattered light to a compensator 508. Compensator 508 provides two paths having different propagation times, thereby producing a combined beam that is a combination of the backscattered light with a time-delayed version of the backscattered light. This compensator thereby enables an interference measurement between backscattered light from spaced-apart locations on the fiber. The phase difference between the backscattered light beams is measured with a 3×3 coupler 552, which produces three outputs having 120° phase separation. The three outputs are further subdivided with wavelength division multiplexers 554-1 through 554-3, which separate the signals by wavelength. Two receivers 556A-1 and 556B-1 measure the respective wavelengths from the first output of the 3×3 coupler, two receivers 556A-2 and 556B-2 measure the wavelengths from the second output, and two receivers 556A-3 and 556B-3 measure wavelengths from the third output. The three measurements for each wavelength can then be combined to determine the in-phase and quadrature components Referring to the coupler outputs for a given wavelength as A, B, and C, we have the following relations:

$A = \cos[\text{Phase}]$ $B = \cos[\text{Phase} - 120°]$ $C = \cos[\text{Phase} + 120°]$ $I = \sqrt{3}(A - B)$ $Q = A + B - 2C$ The calculation of phase and quality factor can then proceed as before.

Figure 6:
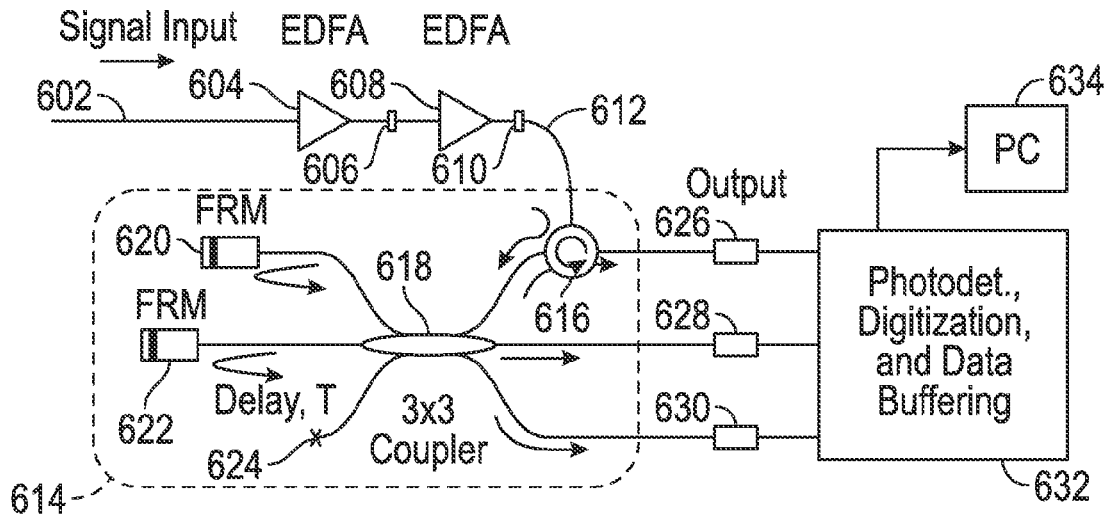
FIG. 6 shows a detail view of a homodyne system component.

FIG. 6 shows the receiving end of an illustrative distributed sensing system which may be suitable for use with a system employing spatial mode diversity. The transmitter couples coherent light pulses to multiple modes in a few-mode fiber. The backscattered light within each mode is separated by a spatial mode multiplexer. Each one of the spatial mode multiplexer outputs is processed as indicated by FIG. 6. The multiplexer output 602 (labeled Signal Input in FIG. 6) is amplified by a first and second EDFA 604, 608, each of which is provided with a filter 606, 610 to block out-of-band noise. The amplified signal enters a combined 3×3 coupler/compensator unit 614 via an input 612. A circulator 616 directs the input light into a 3×3 coupler 618. The light exits the coupler on three ports. Port 620 is coupled to a Faraday rotator mirror (FRM) that returns the light to port 620. Port 622 is coupled via a delay line to a second FRM, which returns the light to port 622 with an added delay. Port 624 is terminated with an absorber.

The light returning to ports 620 and 622 is combined by the 3×3 coupler to obtain an interference signal that is directed to output ports 626, 628, 630, with the usual 120° phase spacing. Receiver electronics 632 convert the optical signals to electrical signals, which are then digitized and buffered for retrieval by a personal computer 634 or other form of data acquisition device. The signal phase can be determined for each spatial mode measurement and combined as outlined previously.

Additional lasers can be added to the system of FIGS. 5-6 to provide additional wavelengths, limited only by the capacity of the amplifiers. An acousto-optic modulator can be employed to add additional frequency components (frequency division multiplexing, or FDM), alone or in combination with the illustrated wavelength division multiplexing technique. On the receiving end, additional filters and receivers can be employed to obtain the independent parallel measurements.

Aside from reduced number of fibers (and commensurate reduction in the cost of the cable), the WDM, FDM, spatial mode multiplexed, and combinations thereof, exhibit the potential advantage of having easily alignable channels. With multiple fibers, each fiber will have a slightly different overstuff/winding factor that would create a gradually accumulating spatial offset between the distributed acoustic sensing channels on the different fibers. When multiplexing parallel measurements on a single fiber, the channel offsets can be readily calculated based on speed of light in the fiber at various wavelengths or propagation modes, and in many cases the channel offset determination may not be needed at all (e.g., when employing closely spaced wavelengths).

Figure 7:
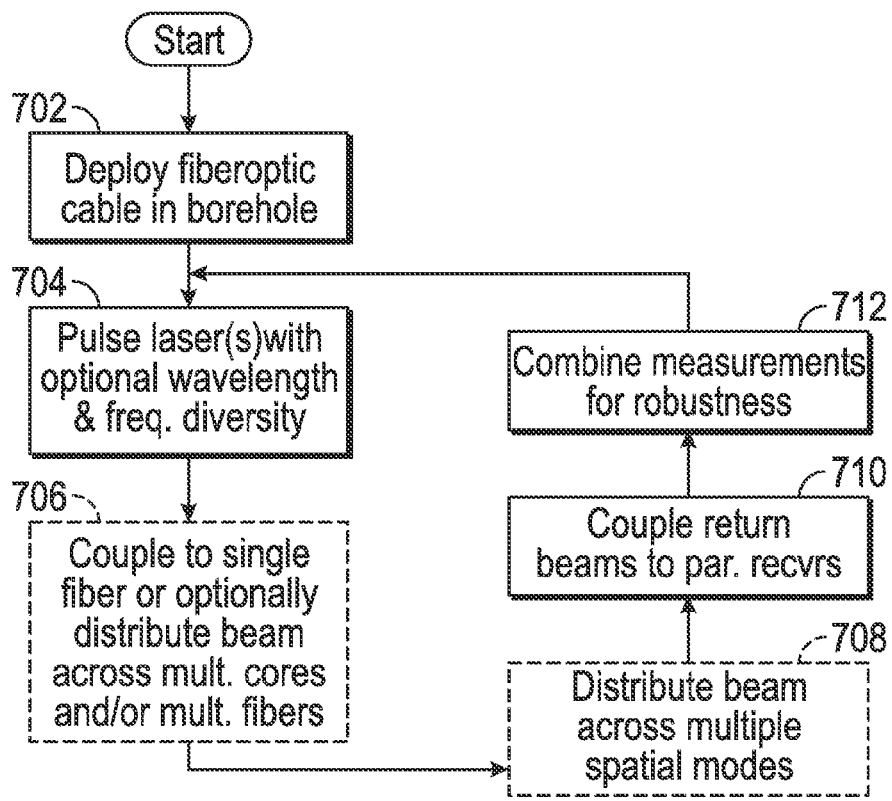
FIG. 7 is a flowchart of an illustrative robust distributed sensing method.

FIG. 7 shows an illustrative distributed sensing method. In block 702, the fiberoptic cable is deployed in the borehole, either by being strapped to a tubing string as the tubing string is lowered into the borehole, or by being transported into place with a weighted end and/or frictional fluid flow. The deployment is completed by connecting the fiberoptic cable to an interface that enables the cable to be interrogated by distributed sensing electronics.

In block 704, the distributed sensing system generates one or more laser pulses, optionally containing multiple wavelengths (WDM) and/or frequencies (FDM). In block 706, the system couples the (optionally multi-wavelength or multi-frequency) pulses to a single fiber or optionally distributes the pulse energy across multiple cores and/or multiple fibers within the fiberoptic cable. In block 708, the system optionally employs a spatial mode multiplexer to distribute the pulse energy across multiple spatial modes within each fiber. In block 710, the system couples the backscattered light from each fiber, each core, each spatial mode, each frequency, and/or each wavelength, to an arrangement of parallel receivers configured to measure the phase (or phase difference) of the backscattered light from each position along the cable. In block 712, the measurements from corresponding channels are combined to improve signal-to-noise ratio and robustness to polarization fading. Blocks 704-712 are repeated to enable the system to track phase as a function of time, thereby providing distributed acoustic sensing.

Using f to represent the number of parallel fibers, c to represent the number of cores in each fiber, s to represent the number of spatially multiplexed modes, w to represent the number of wavelengths, and m to represent the number of multiplexed frequencies, the number of independent paths (and hence the number of parallel measurements obtained by the system) is the product n=fcswm. Even with n in the range of 2 to 4, greatly enhanced system performance is expected.

Numerous variations and modifications will become apparent to those skilled in the art once the above disclosure is fully appreciated. For example, the figures show system configurations suitable for production monitoring, but they are also readily usable for monitoring treatment operations, cementing operations, active and passive seismic surveys, and field activity monitoring. It is intended that the following claims be interpreted to embrace all such variations and modifications.

What is claimed is:

1. A distributed sensing system that comprises:
   a fiberoptic cable;
   a transmitter module coupled to the fiberoptic cable to communicate light in each of multiple independent paths to each of multiple positions along the cable;
   a receiver module coupled to the fiberoptic cable to receive backscattered light from said multiple positions along the cable via the multiple independent paths, wherein the receiver module includes at least one receiver for each of said multiple independent paths to obtain simultaneous measurements for each of said multiple positions; and
   a processing unit that associates the measurements with channels representing said multiple positions, wherein the processing unit combines channel measurements from multiple independent paths to obtain, for each channel, a combined channel measurement.

2. The system of claim 1, wherein the simultaneous measurements are each a phase measurement representing vibration or acoustic energy at an associated one of the multiple positions.

3. The system of claim 1, wherein the processing unit accounts for measurement quality when obtaining the combined channel measurement.

4. The system of claim 1, wherein the processing unit aligns the channels from different paths before combining channel measurements.

5. The system of claim 1, wherein the multiple independent paths comprise multiple optical fibers in the cable.

6. The system of claim 1, wherein the multiple independent paths comprise multiple cores in a multicore fiber.

7. The system of claim 1, wherein the multiple independent paths comprise multiple wavelengths or multiple frequencies multiplexed along a single fiber.

8. The system of claim 1, wherein the multiple independent paths comprise orthogonal spatial modes multiplexed along a single fiber.

9. The system of claim 1, wherein the transmitter module communicates light pulses.

10. A distributed sensing method that comprises:
    repeatedly transmitting at least one light pulse via multiple independent paths along a fiberoptic cable;
    receiving, via each of the multiple independent paths, backscattered light from multiple positions along the fiberoptic cable;
    simultaneously measuring, for each of the multiple independent paths, a backscattered light phase for each of the multiple positions along the fiberoptic cable; and
    deriving for each of the multiple positions a combined phase measurement from the measured backscattered light phases associated with that position on the multiple independent paths.

11. The method of claim 10, further comprising:
    tracking the backscattered light phase for each position as a function of time to obtain an acoustic or vibration signal for each of the multiple positions along the fiberoptic cable.

12. The method of claim 11, wherein said deriving includes correlating the acoustic or vibration signals associated with different paths to align positions on the multiple independent paths.

13. The method of claim 10, wherein said deriving includes determining a quality factor as a function of path and position.

14. The method of claim 13, wherein said deriving includes normalizing the measured backscattered light phases in accordance with associated quality factors.

15. The method of claim 10, wherein said deriving includes aligning the multiple positions on the multiple independent paths before combining backscattered light phases for corresponding positions.

16. The method of claim 10, wherein said multiple independent paths have at least one type of diversity from a set consisting of wavelength diversity, frequency diversity, spatial mode diversity, core diversity, and fiber diversity.

17. The method of claim 16, wherein said multiple independent paths have at least two types of diversity from said set.

18. The method of claim 10, wherein the at least one light pulse comprises multiple light wavelengths for wave division multiplexing.

* * * * *